US009203480B2

(12) United States Patent
Rahul et al.

(10) Patent No.: US 9,203,480 B2
(45) Date of Patent: Dec. 1, 2015

(54) COHERENT TRANSMISSION FROM DISTRIBUTED WIRELESS TRANSMITTERS USING LEGACY RECEIVERS

(71) Applicants: Hariharan Shankar Rahul, Cambridge, MA (US); Swarun Suresh Kumar, Cambridge, MA (US); Dina Katabi, Cambridge, MA (US)

(72) Inventors: Hariharan Shankar Rahul, Cambridge, MA (US); Swarun Suresh Kumar, Cambridge, MA (US); Dina Katabi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 108 days.

(21) Appl. No.: 13/646,068

(22) Filed: Oct. 5, 2012

(65) Prior Publication Data

US 2014/0003338 A1    Jan. 2, 2014

Related U.S. Application Data

(60) Provisional application No. 61/665,406, filed on Jun. 28, 2012.

(51) Int. Cl.
| | |
|---|---|
| *H04W 4/00* | (2009.01) |
| *H04B 7/02* | (2006.01) |
| *H04L 25/02* | (2006.01) |
| *H04B 7/06* | (2006.01) |

(52) U.S. Cl.
CPC .............. *H04B 7/024* (2013.01); *H04B 7/0691* (2013.01); *H04L 25/0204* (2013.01)

(58) Field of Classification Search
CPC ...... H04B 7/04; H04B 7/0404; H04B 7/0413; H04L 5/003

USPC .......................................... 370/328, 329, 334
See application file for complete search history.

(56) References Cited

U.S. PATENT DOCUMENTS

| | | | |
|---|---|---|---|
| 8,150,345 | B2 | 4/2012 | Roy et al. |
| 8,290,443 | B2 | 10/2012 | Stirling-Gallacher et al. |
| 8,428,524 | B2 | 4/2013 | Kim et al. |

(Continued)

FOREIGN PATENT DOCUMENTS

| | | |
|---|---|---|
| WO | 2006/124810 | 11/2006 |
| WO | 2008/069467 | 6/2008 |
| WO | 2010/041236 | 4/2010 |
| WO | WO 2011/115703 | 9/2011 |

OTHER PUBLICATIONS

Berger et al., Carrier Phase Synchronization of Multiple Distributed Nodes in a Wireless Network,: IEEE 8$^{th}$ Workshop on Signal Processing Advances in Wireless Communications, 2007, pp. 1-5 XP031189422.

(Continued)

*Primary Examiner* — Farah Faroul
(74) *Attorney, Agent, or Firm* — Occhiuti & Rohlicek LLP

(57) ABSTRACT

A distributed wireless communication system includes multiple access points, each with one or more antennas. The access points do not necessarily have synchronized transmitting and receiving radio frequency oscillators. Approaches to channel estimation between the access points and one or more wireless clients account for the lack of synchronization, and do not necessarily require capabilities at the clients that go beyond required or optional features of standard wireless Ethernet (e.g., 802.11n, 802.11g, or 802.11a), thereby supporting "legacy" clients while supporting high data throughput approaches that provide coherent transmission from the multiple antenna of the access points.

18 Claims, 3 Drawing Sheets

(56) References Cited

U.S. PATENT DOCUMENTS

| | | | |
|---|---|---|---|
| 8,792,444 | B2 | 7/2014 | Ishida et al. |
| 8,797,970 | B2 | 8/2014 | Xing et al. |
| 2005/0195914 | A1 | 9/2005 | Kim et al. |
| 2006/0251156 | A1* | 11/2006 | Grant et al. ............... 375/148 |
| 2008/0031309 | A1 | 2/2008 | Chang et al. |
| 2008/0075158 | A1 | 3/2008 | Li |
| 2008/0181174 | A1 | 7/2008 | Cho |
| 2008/0227422 | A1 | 9/2008 | Hwang et al. |
| 2009/0122773 | A1* | 5/2009 | Gogic ........................ 370/338 |
| 2010/0172421 | A1 | 7/2010 | Okamura et al. |
| 2010/0290555 | A1* | 11/2010 | Mege ........................ 375/295 |
| 2011/0065408 | A1 | 3/2011 | Kenington et al. |
| 2011/0317785 | A1* | 12/2011 | Petrov et al. ............... 375/295 |
| 2012/0008599 | A1* | 1/2012 | Marin et al. ............... 370/336 |
| 2013/0102256 | A1 | 4/2013 | Cendrillon et al. |
| 2013/0114468 | A1* | 5/2013 | Hui et al. ................... 370/277 |
| 2013/0301487 | A1 | 11/2013 | Khandani |
| 2014/0056205 | A1* | 2/2014 | Aboul-Magd et al. ....... 370/312 |

OTHER PUBLICATIONS

Yang et al., "Some Phase Synchronization Algorithms for Coherent MIMO Radar," IEEE 4$^{th}$ Annual Conference on Information Sciences and Systems, 2011, pp. 1-6, XP031866416.

Tu et al., "Coherent Cooperative Transmission from Multiple Adjacent Antennas to a Distant Stationary Antenna through AWGN Channels," IEEE 5$^{5th}$ Vehicular Technoligy Conference, 2002, col. 1, pp. 130-134, XP001210362.

Berger et al., "A Coherent Amplify-and-Forward Relaying Demonstrator Without Global Phase Reference," IEEE 19$^{th}$ International Symposium on Personal, Indoor and Mobile Radio Communications, 2005, pp. 1-5 XP031371267.

Ng et al., "Linear Precoding in Cooperative MIMO Cellular Networks with Limited Coordination Clusters," IEEE Journal on Selected Areas in Communications, 28(9): 1446-1545 (2010).

Tolli et al., "Decentralized Minimum Power Multi-Cell Beamfoaming with Limited Backhaul Signaling," IEEE Transaction on Wireless Communication, 10 (2): 570-580 (2011).

Barriac et al., "Distributed Beamforming for Information Transfer in Sensor Networks," IPSN'04, Apr. 26-27, 2004 (entire document, 8 pages).

Brown, III et al., "A Method for Carrier Frequency and Phase Synchronization of Two Autonomous Cooperative Transmitters," 2005 IEEE 6$^{th}$ Workshop on Signal Processing Advances in Wireless Communications, pp. 260-264 (2005).

Rahul et al., "A Distributed Wireless Architecture for Exploiting Sender Diversity," ACM SIGCOMM, Aug. 2010 (entire document, 12 pages).

* cited by examiner

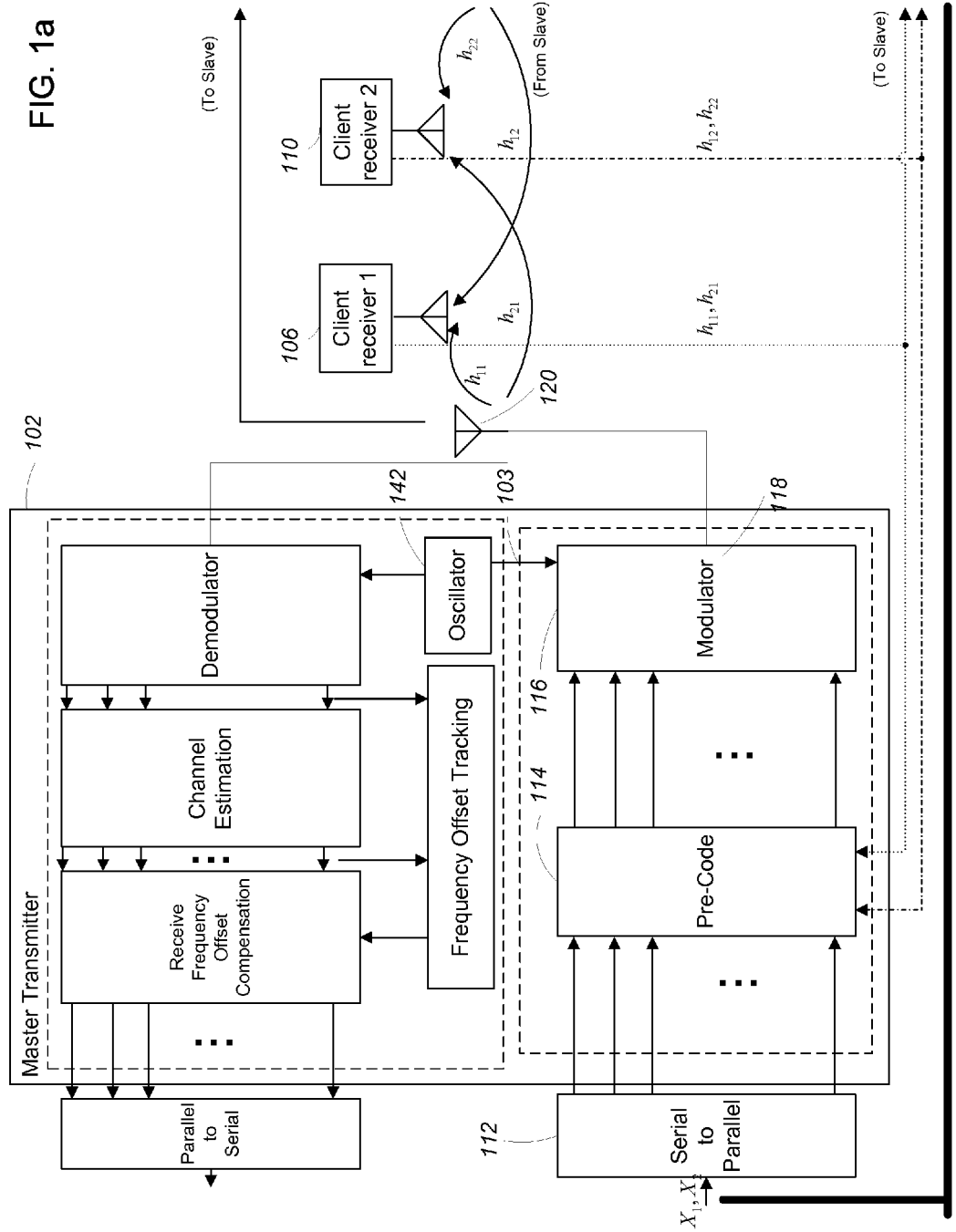

COHERENT TRANSMISSION FROM DISTRIBUTED WIRELESS TRANSMITTERS USING LEGACY RECEIVERS

CROSS-REFERENCE TO RELATED APPLICATIONS

This application claims the benefit of U.S. Provisional Application 61/665,406, filed on Jun. 28, 2012, the contents of which are incorporated herein by reference.

This application is related to, but does not claim priority to, U.S. Provisional Application 61/543,832, filed on Oct. 6, 2011, the contents of which are incorporated herein by reference.

GOVERNMENT SUPPORT

This invention was made with Government support under Grant No. CNS-0831660 awarded by the National Science Foundation. The Government has certain rights in the invention.

BACKGROUND

This invention relates to coherent transmission from distributed wireless transmitters. In some examples, these transmitters are access points (APs) in 802.11n wireless network and the receivers are conventional 802.11n clients.

Communication capacities of conventional wireless networks, such as 802.11 or cellular networks, can be limited by interference. For example, the wireless medium is shared, and as a result, if two nearby devices transmit simultaneously, their transmissions typically interfere, preventing either device from delivering its frame. Recent advances in wireless technology have resulted in empirical wireless systems such as Spatial Multiple Access (SAM), Interference Alignment and Cancellation (IAC) and beamforming. These systems have demonstrated that concurrent transmissions across different transmitters in the same interference region are possible. The throughput in wireless networks employing these systems can be doubled or tripled.

However, such systems remain limited by the maximum number of antennas on an individual node, and cannot continuously scale the throughput as more transmitters join the systems. Conventional wireless networks, for example, 802.11 and cellular systems, may alleviate this problem by using all available channels or employing sectorized antennas. However, such techniques provide only a small constant gain that does not scale as the number of users increases. Furthermore, simply adding additional transmitters does not improve user throughput, because these transmitters interfere with each other.

There is a need for a wireless networking system that can scale throughput linearly as the number of users increases, yielding a fully scalable wireless network.

SUMMARY

In one aspect, in general, a method for determining channel characteristics between a plurality of wireless source stations (e.g., wireless infrastructure access points), together having a plurality of antennas, and each of one or more wireless destination stations (e.g., wireless clients), each destination station having one or more antennas, makes use of a sequence of multiple stages. In each of the multiple stages, known independent signal streams are transmitted from a subset of antennas. A different subset is used in each of the multiple stages with each subset sharing at least some antennas with at least one other subset. The streams are received at a first destination station of the wireless destination stations. Data characterizing transmission channels via the subset of antennas to the first destination station is determined at the first destination station, which communicates the data to one or more of the access points. The data for the different subsets are combined to form consistent channel estimates from each of the access points via the antennas to the first destination station. In some examples, combining the data includes compensating for a phase factor for each of at least some of the stages. In some examples, this method is repeated for multiple destination stations to yield channel estimates via each of the antennas to each of the destination stations.

In another aspect, in general, a method for determining channel characteristics from a plurality of wireless source stations to each of one or more wireless destination stations makes use of an exchanging of a first set of transmissions including known symbols between a first source station and a second source station. In at least some examples, at least a first source station and a second source station have radio frequency oscillators used for transmitting and receiving (i.e., for modulation and demodulation, respectively) that are unsynchronized to one another in frequency and/or phase. The first set of transmissions is used to determine first data characterizing a relationship of transmit and receive path characteristics between the first and the second source stations. A transmission including known symbols from a first destination station is received at each of the first source station and a second source station. The first data and the transmission received at the first and the second source stations are combined to determine channel characteristics for transmissions from the first and the second source stations to the first destination station.

In some examples, receiving the transmission at each of the first source station and the second source station includes demodulating the transmission at the first source station to form a first demodulated signal and at the second source station to form a second demodulated signal, and the method further comprises receiving a synchronizing transmission from the first source station at the second source station and determining synchronizing data characterizing at least one of a difference in demodulation frequency and demodulation phase between the first source station and the second source station. Combining the first data and received transmission includes using the synchronization data and the first and the second demodulated signals to determine the channel characteristics.

In some examples, the first data is repeatedly updated by repeating the steps of exchanging transmissions and using the transmissions to determine the first data.

One or more aspects address technical problems including increasing aggregate data throughput to a set of receivers (i.e., wireless personal devices), for example, in a densely populated space such as a conference or performance center. In situations in which a wireless network is partitioned into separate cells (e.g., each operating at a separate frequency), such cells may be made larger while maintaining or increasing the overall data throughput. Fewer of such larger cells may be more easily managed. A further advantage of one or more aspects is that the increase in data throughput can be achieved without requiring non-standard capabilities at the receivers, for example, exploiting required or optional features of a wireless Ethernet standard (e.g., 802.11n).

DESCRIPTION OF DRAWINGS

FIG. 1a is a master transmitter.

DESCRIPTION

1 Overview

Figure 1B:
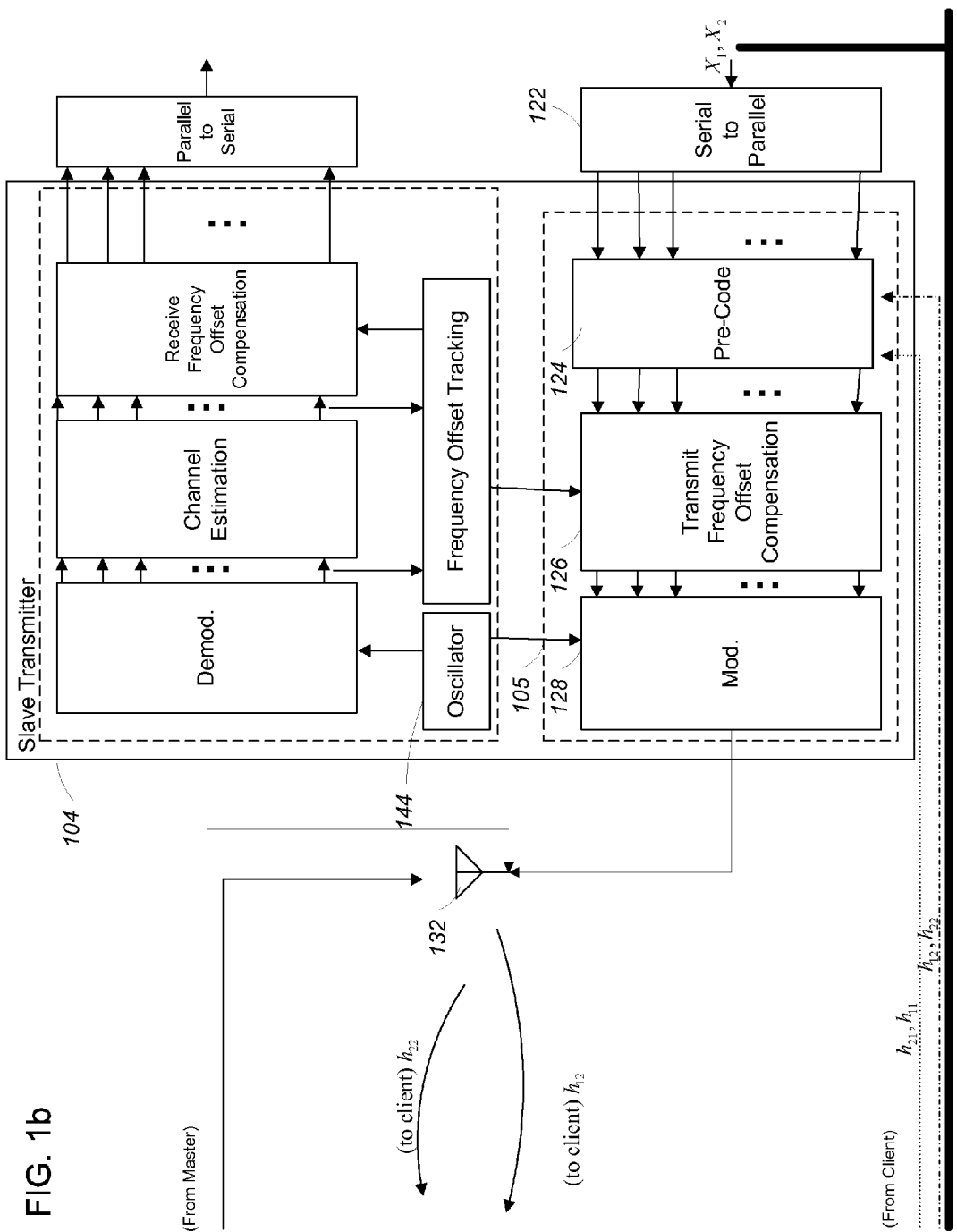
FIG. 1b is a slave transmitter.

The system described herein allows N single-antenna transmitters with independent frequency and clock references to emulate a system where the N transmitters have access to a common carrier reference with a consistent phase and frequency across access points. This allows the N single-antenna transmitters to emulate, for instance, a single N-antenna multiple-input multiple-output (MIMO) transmitter. The emulated N-antenna MIMO transmitter can transmit N concurrent streams that do not interfere with each other, delivering N concurrent streams to N users by beamforming, nulling, or more general Multiple-Input-Multiple-Output (MIMO) techniques, for instance, nulling at particular receivers while transmitting fewer than N streams. Such a system could be deployed, as an example, in a large room (e.g., a conference center) or an outdoor setting (e.g. a dense urban area) to provide tens or hundreds of transmitters that enable concurrent transmission of a commensurate number of data streams without interference. More generally, some or all of the multiple transmitters and some or all of the user devices may have multiple antennas.

In various examples discussed below, the "transmitters" (or "source stations") can be various types of nodes in a communication network that function, at least in part or at some times, as transmitters. The "transmitters" generally include transmitter and receiver components, and are referred to as "transmitters" in their role as transmitting one or a subset of the coherent transmissions to client "receivers" (or "destination stations"), which also generally include transmitter and receiver components, and a referred to as "receivers" in their role as receiving the multiple coherent signals from multiple "transmitters". Such transmitters can include, without limitation, wireless Ethernet infrastructure access points (APs), for instance in 802.11n access points, wireless repeater stations, base stations, for instance in cellular networks, relay stations, or other wireless nodes. In the rest of this document, unless explicitly indicated otherwise, the terms "transmitter" and "access point" is used broadly to refer to any of these kinds of nodes that transmit to other wireless stations.

For a client receiver (referred to simply as the "client" or "receiver" in some instances below) to decode its intended signal without interference, it is desirable that the N−1 signals intended for the other clients cancel (i.e., destructively interfere with) each other at that client. For cancellation to occur, each transmitter controls the phase (and magnitude) of its transmitted signals such that cancellation is achieved at every unintended client, for every transmitted symbol. Controlling the phase between transmitted signals is relatively simple for a single N-antenna transmitter when all of the transmit antennas share the same oscillator. In contrast, in a distributed setting, the transmit antennas are on different transmitters, and hence each transmit antenna is connected to a different oscillator. Different oscillators naturally have unknown phase shifts with respect to each other. Furthermore, since different oscillators never have the same exact frequency, and since different transmitters might independently choose to turn off their oscillators, for instance, to reduce operating power, these phase shifts change over time. Enforcing the consistent phase synchronization in this distributed setting is highly challenging.

It should be understood that although certain discussion below focuses on transmitters each with a single antenna, the approaches are applicable where some or all of the transmitters have multiple antennas controlled according to common oscillators. In such cases, within one transmitter, the signals transmitted from that transmitter's antennas naturally maintain consistent phase relative to one another by virtue of the use of the common oscillators. For example, N 2-antenna access points could therefore emulate a 2N-antenna access point.

Referring to FIGS. 1a and 1b, in an illustrative example (e.g., N=2 transmitters, recognizing that the approach is applicable to much larger numbers of access points and client receivers) a single antenna master transmitter 102, a single antenna slave transmitter 104, and two single antenna client receivers 106, 110 are configured to communicate wirelessly over a shared medium. Note that the antennas as shown as coupled to both transmitter and receiver sections at the devices, with coupling and/or switching circuitry not shown. The master transmitter 102 controls concurrent transmission of two data frames, $X_1$ and $X_2$, to the two receivers, respectively. The signals emitted from the antennas of the master transmitter and the slave transmitter are synchronized to achieve the desired constructive and destructive interference at the antennas of the receivers.

In this example, both the master transmitter and the slave transmitter have access to the data frames $X_1$ and $X_2$ that are to be transmitted to the receivers. For instance, each transmitter may have received the data frames over a wired network (or wireless network, say on the same or different frequencies) linking the transmitters.

Referring to FIG. 1a, to transmit the two frames, the master transmitter 102 receives a data frame (i.e., receives the data packet for the payload to be transmitted in the frame) and provides the data to a master parallelization module 112. The master parallelization module 112 parallelizes the stream of symbols into K sequences, for example $X_1$ to $x_{1,0}^{(k)}, x_{1,1}^{(k)}, x_{1,2}^{(k)}, \ldots$ for $k=0, \ldots, K-1$, of values represented by complex values (symbols) from a fixed constellations (e.g., QAM constellations). As outlined below, each of the sequences will be modulated to a different frequency in an Orthogonal Frequency Division Multiplexing (OFDM) approach.

The master parallelization module 112 outputs the mapped symbols $x_{1,0}^{(k)}, x_{1,1}^{(k)}, x_{1,2}^{(k)}, \ldots$ for the first receiver and the mapped symbols $x_{2,0}^{(k)}, x_{2,1}^{(k)}, x_{2,2}^{(k)}, \ldots$ for the second receiver to a master pre-coding module 114 in a master transmit portion 103. The master pre-coding module 114 also receives channel transfer functions representing the channels from the transmit antennas of each transmitter 102, 104 to the (receive) antennas of each of the receivers 106, 110. Since there are two transmitters and two receivers in the system of FIG. 1, there are four channel transfer functions for each: $h_{11}$, $h_{12}$, $h_{21}$, $h_{22}$. $h_{11}$ is the channel transfer function from the master transmitter 102 to the first receiver 106. In general, the transfer function for each frequency component is a separate complex number, but the k-dependence is omitted from the notation for clarity and/or the channel $h_{ij}$ can be considered to be a K-dimensional complex vector. $h_{21}$ is the channel transfer function from the master transmitter 102 to the second receiver 110. $h_{12}$ is the channel transfer function from the slave transmitter 104 to the first receiver 106. $h_{22}$ is the channel transfer function from the slave transmitter 104 to the second receiver 110.

Considering a single frequency component k (and omitting the k dependence in the notation below), the master pre-coding module 114 pre-codes the mapped symbols based on the channel transfer functions $h_{11}, h_{12}, h_{21}, h_{22}$ to produce the combined precoded symbols $y_{1,0}, y_{1,1}, \ldots$ such that the mapped symbols are received in combination with the transmission from the slave transmitter at the antenna of the first receiver 106 to provide $x_{1,0}, x_{1,1}, \ldots$ and cancel $x_{2,0}, x_{2,1}, \ldots$ while providing $x_{2,0}, x_{2,1}, \ldots$ at the antenna of the second receiver 110 and cancelling $x_{1,0}$, $x_{1,1}$, . . . . Conventional MIMO techniques are implemented by the master precoding module 114 and will not be discussed further herein.

The output of the master pre-coding module 114 is provided to a master modulation module 116 which converts each of the mapped, pre-coded symbols into a time domain waveform. At least conceptually, a baseband time waveform is formed such that effectively the $k^{th}$ component is modulated to a frequency $k\gamma_1$, where the factor $\gamma_1$ depends on the sampling rate of the conversion to a time signal in the modulator and is substantially proportional to the desired sampling frequency $\gamma_s$. The master modulation module is driven by the master modulator 116, which produces a carrier signal substantially at the desired carrier frequency $\omega_c$, and more precisely representing modulation of the $k^{th}$ input by the complex sinusoidal signal $\exp j((\omega_1(t)+k\gamma_1(t))t)$ such that $\omega_1(t) \approx \omega_c$, $\gamma_1(t) \approx \gamma_s$ and $\omega_1(t)$ and $\gamma_1(t)$ may be slowly varying. The output of the master modulation module 116 is a time domain signal including a sum of N orthogonal sub-carriers, each sub-carrier carrying one symbol. The output of the master modulation module 116 is provided to a master antenna 120.

Referring to FIG. 1b, the transmit portion 105 of the slave transmitter 104 transmits symbols in much the same way as the master access point 102. However, as introduced above, the slave access point has a separate oscillator 144, which is used to modulate transmissions from the slave access point. The slave oscillator 144 produces a carrier signal substantially at the desired carrier frequency $\omega_c$, and more precisely representing the complex sinusoidal signal $\exp j((\omega_2(t)+k\gamma_2(t))t)$ such that $\omega_2(t) \approx \omega_1(t) \approx \omega_c$, $\gamma_1(t) \approx \gamma_2(t) \approx \gamma_s$, typically with $\omega_1(t) \neq \omega_2(t)$, and $\gamma_1(t) \neq \gamma_2(t)$. These differences are explicitly accounted for as described below.

At each of the master and slave, a demodulator on the received path makes use of the same oscillator (142, 144), and therefore differences between the oscillators are manifested both on the receive and transmit paths of the access points.

In order to emit coordinated (e.g., coherent) transmissions from the multiple access points, two issues are addressed:
 a. Synchronizing transmissions from multiple access points such that they maintain a consistent relative phase within a single simultaneous frame transmission; and
 b. Determining channel estimates, which are consistent with the consistent relative transmission phases, between access points and clients such that MIMO techniques can be applied to precode transmissions such that multiple data streams can be transmitted to their intended destinations during the simultaneous transmissions.

For the first of these issues, it is important to note that simply correcting for oscillator frequency may result in a consistent phase within one frame transmission. However, small errors in estimate of the difference in oscillator frequency can result in the relative phase of the simultaneous transmissions varying from frame to frame, thereby making it difficult to maintain an estimate of the channels from the access points to the clients that are valid for long enough to be useful.

Therefore, the approach to synchronization addesses both compensation for frequency offset and phase offset at each frame transmission and adjusting the phase for successive symbols in the transmission of the frame. As introduced in U.S. Provisional Application 61/543,832, the general approach is to make use of a synchronizing frame transmission from a lead access point that is received by one or more slave access points shortly before the simultaneous transmission to clients by the lead and the one or more slave access points. Generally, and as explained in more detail below, the slave access points use the received synchronizing transmission from the lead access point to compensate their simultaneous transmissions to achieve their consistent fixed relative phase to the lead access point.

The issue of determining channel estimates from the access points to the clients can be addressed in a variety of ways. Some approaches, some of which are described in U.S. Provisional Application 61/543,832, make use of clients that are aware that transmissions emit from multiple access points, and with suitable coordination provide feedback to the access points to permit estimation of the downlink channels and application of MIMO techniques for subsequent downlink transmissions from the access points.

Some approaches, which are introduced below, do not require that the clients are aware that the transmissions emit from multiple access points. In some examples, the approaches make use of standard client features, which are intended to provide feedback to a single multi-antenna access point, but can nevertheless be leveraged to provide feedback to multiple access points enabling estimation of the multiple channels between access points and clients. In some examples, uplink transmissions, which are received at multiple access points, are used to estimate the downlink channels using a reciprocity approach.

2 Principles of Operation

Before discussion of specific embodiments, a number of principles of operation are described in a specific context of two single-antenna access points, one a master and one a slave, which communicate with two single-antenna clients. It should be understood that this is a very simple illustrative example, and that the principles of operation extend naturally to more than two access points, and to access points and clients each with multiple antennas.

Figure 2:
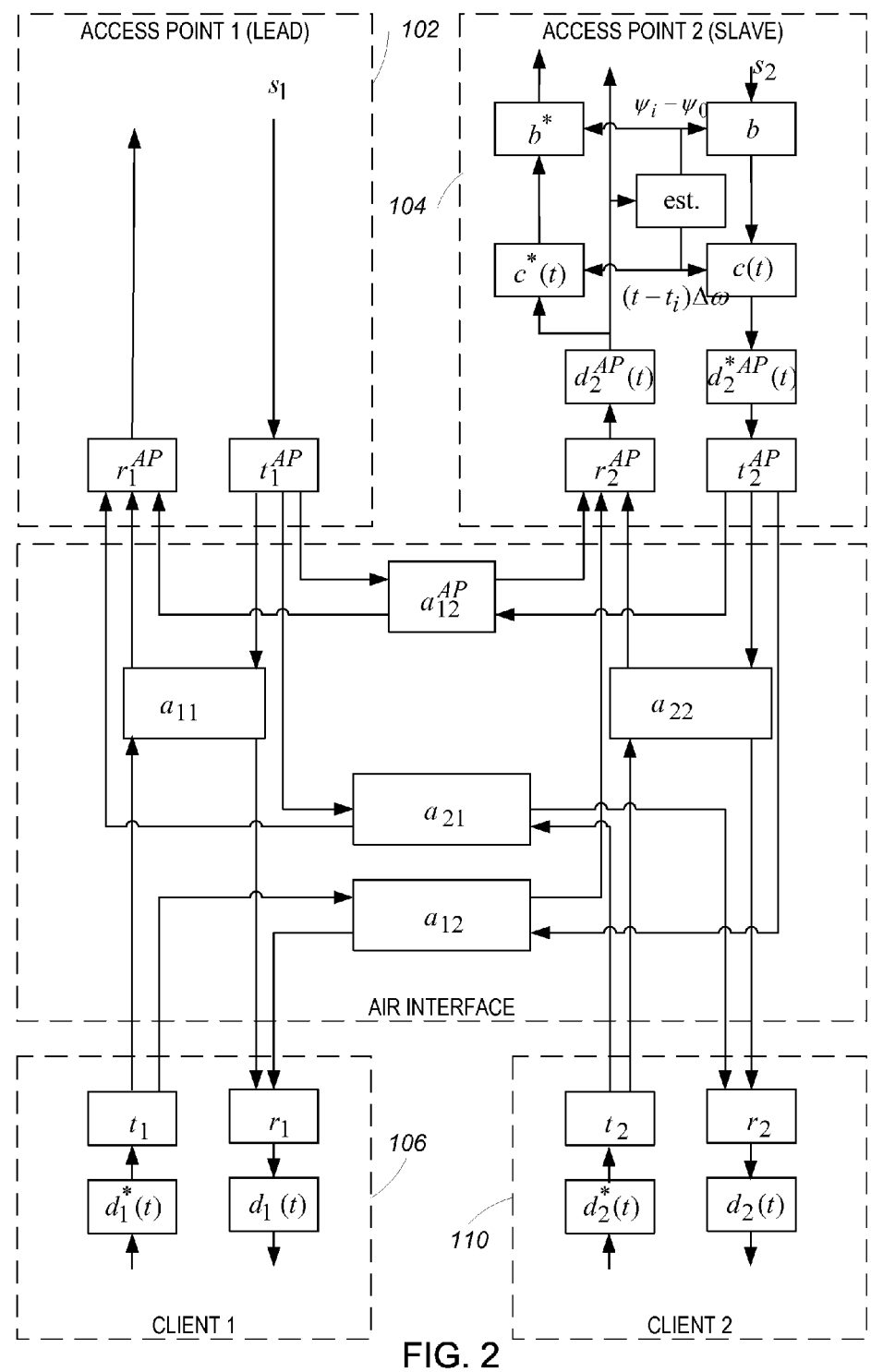
FIG. 2 is a block diagram of a model of baseband transmission paths.

Referring to FIG. 2, signal paths from between access points and clients can be decomposed into their equivalent baseband components as shown. FIG. 2 shows input signals (i.e., complex values) $s_1$ and $s_2$, which are transmitted from the lead access point 102 and slave access point 104 such that they combine to form (scaled versions of) desired signals $x_1$ and $x_2$ at clients 106 and 110, respectively. Signals $s_1$ and $s_2$ are representative values at a particular frequency (k), at a time offset within a transmission frame—but for clarity of expanation the frequency and time dependence are omitted from the notation.

The input signals are determined using conventional MIMO techniques based on channels estimates between the access points and the clients, for examples as $(s_1, s_2)^T = H^{-1}(x_1, x_2)^T$, or more generally a power limited version, for example $(s_1, s_2)^T = \beta H^{-1}(x_1, x_2)^T$ where $\beta$ is chosen to satisfy power constraints at the master and/or slave access points. One aspect discussed below is an approach to determining suitable entries for the channel matrix H such that the signals $s_i$ yield the desired combinations at the clients. The application of $H^{-1}$ is not shown in FIG. 2.

The components of the signal paths are shown in detail in FIG. 2, however, in operation it is not necessary to consider each component individually, and the system in FIG. 2 does not necessarily correspond to the physical structure, while still providing a basis for describing the procedures used.

At the lead access point 102, in the transmit path, the hardware (e.g., amplifier, antenna, antenna-air interface, etc.) introduces a complex (generally time-invariant) gain $t_1^{AP}$. Note that FIG. 2 illustrates a single frequency component, and therefore the gains shown in the figure are generally dependent on the frequency. Similarly, the receive path includes a gain $r_1^{AP}$. Note that in general, the (complex) gains on the transmit and receive paths are not equal. The slave access point 104 similarly has transmit and receive path gains $t_2^{AP}$ and $r_2^{AP}$, respectively.

In addition, as introduced above, the receive path at a slave includes a time varying, unit gain, "rotating" phase component, which can be approximated as $d_2^{AP}(t) \approx \exp j(\theta_n + (t-\tau_n)\Delta\omega_n)$ near time $\tau_n$, which represents the mismatch between the oscillator frequency and the sampling frequency at the slave access point relative to the master access point. Because the same oscillators and sampling clocks are used on the output path of the slave access point, the output path also includes a rotating phase component $d^*{}_2^{AP}(t) \approx \exp(-j(\theta_n + (t-\tau_n)\Delta\omega_n))$, with rotating phase components that are rotating in the opposite direction than on the receive path. (Note that the term $\Delta\omega_n$ is in general dependent on the frequency component k, for example reflecting both the oscillator frequency offset, as well as factors that depend on the sampling frequency for the modulation and demodulation.)

As illustrated, the clients similarly have transmit and receive path gains, $t_i$ and $r_i$, as well as rotating phase components $d_i(t)$ that account for the mismatch of the client oscillators and sampling clocks.

The over-the-air paths between access points i and j are shown as $a_{ij}^{AP}$ and are assumed to be reciprocal. Similiarly, the reciprocal path between access point i and client j is shown as $a_{ij}$.

2.1 Slave Transmit Compensation for Oscillator Frequency and Phase Offset

Referring again to the slave access point 104, when the slave access point receives a transmission from the master access point, known values ("pilot symbols") in the transmission allow the slave to determine a magnitude and a phase of the path from the master to the slave. This path is considered to have a relative constant part with gain $r_2^{AP} a_{12}^{AP} t_1^{AP}$ as well as the part $d_2^{AP}(t)$, which as introduced above is modeled locally as $d_2^{AP}(t) \approx \exp j(\theta_n + (t-\tau_n)\Delta\omega_n)$. When the slave receives a transmission at time $\tau_n$, it cannot distinguish between the phase introduced by relatively constant part, but can approximate the total phase as $\angle(d_2^{AP}(t) r_2^{AP} a_{12}^{AP} t_1^{AP}) = \psi_n + (t-\tau_n)\Delta\omega_n$.

On the transmit path, the slave access point includes phase adjustment elements b and c(t) (which are implemented prior to the IDFT and modulation in the transmit path), that introduces an opposite phase of the expected time varying phase difference introduced on the output path by $d^*{}_2^{AP}(t)$. Phase adjustment elements b and c(t) each have unit magnitude and together introduce the opposite phase of $d^*{}_2^{AP}(t)$. At time $\tau_0$, b is initialized to unity, and c(t) is set such to unit magnitude with $\angle c(t) = (t-\tau_0)\Delta\omega_0$. Note that a value $s_2$ transmitted shortly after $\tau_0$ experiences a gain $d^*{}_2^{AP}(t) c(t) b$, which is approximately a constant with unit magnitude and phase $-\theta_0$, prior to passing to the transmit path via the $t_2^{AP}$ block shown in FIG. 2. (Note that the relative phase of the signal provided to the transmit path at the slave via the $t_2^{AP}$ block as compared to the phase of the signal provided to the transmit path at the master via the $t_1^{AP}$ block is therefore $-\theta_0 + \angle(r_2^{AP} a_{12}^{AP} t_1^{AP}) = \psi_0 - 2\theta_0$.)

At a subsequent time, $\tau_n$, when the slave access point receives another transmission from the master, the estimator determines new estimates $\psi_n$ and $\Delta\omega_n$ and updates b and c(t) such that $\angle b = \psi_n - \psi_0$ and $\angle c(t) = (t-\tau_n)\Delta\omega_n$. Note that the change in phase of the oscillator $\theta_n - \theta_0$ is equal to $\psi_n - \psi_0$ (assuming the phase of $r_2^{AP} a_{12}^{AP} t_1^{AP}$ has remained constant), therefore a new value $s_2$ transmitted shortly after $\tau_n$ (i.e., after the blocks b and c(t) are updated) again experiences a constant gain $d^*{}_2^{AP}(t) c(t) b$, which is approximately a constant with unit magnitude and phase $-\theta_0$, prior to passing to the transmit path via the $t_2^{AP}$ block. (Note that as at the time shortly after time $\tau_0$, with the updated blocks b and c(t) and time $\tau_n$ the relative phase of the signal provided to the transmit path at the slave via the $t_2^{AP}$ block as compared to the phase of the signal provided to the transmit path at the master via the $t_1^{AP}$ block is maintained as $-\theta_0 + \angle(r_2^{AP} a_{12}^{AP} t_1^{AP}) = \psi_0 - 2\theta_0$.)

2.2 Coherent Transmission from Master and Slave Access Points

Coherent transmission of values $s_1$ and $s_2$ from the master and the slave access points, respectively, is accomplished by the master access point first sending a synchronizing transmission (i.e., a sequence that includes known symbols) to the slave at a time $\tau_n$. As described above, the slave access point updates its compensation terms according to $\psi_n$ and $\Delta\omega_n$ from that received synchronizing transmission.

At a known time delay, at time $\tau_n + \Delta\tau$, the master and the slave concurrently transmit $s_1$ and $s_2$ respectively (i.e., these symbols are transmitted as part of a larger frame). These transmissions pass to the transmit blocks $t_1^{AP}$ and $t_2^{AP}$ at a fixed relative phase throughout the transmission, so there is no phase rotation between the two signals.

Furthermore, successive transmissions experience the same relative phase as outlined above (i.e., relative phase $\psi_0 - 2\theta_0$). This latter feature is significant in that channel estimates from the slave access point to the clients are not affected by change in the slave oscillator phase and frequency offsets from the master.

It is important to recognize that the slave access point may experience a delay in detecting the transmission from the master access point. For example, suppose it detects the transmission $\delta\tau$ late, and then makes its transmission at time $\tau_n + \Delta\tau + \delta\tau$. Because of the late detection of the known symbols in the transmission form the master, the slave's estimate of the phase is increased by $\delta\psi$, and the increase in the phase of the compensation term b exactly compensates for the late transmission from the slave, thereby the approach is essentially insensitive to the amount of detection delay.

2.3 Slave Receive Compensation for Oscillator Frequency and Phase Offset

On the receive path at the slave access point, a similar compensation for oscillator phase and frequency offset can be accomplished by effectively multiplying the received signal by $b^* c^*(t)$. For example, in the time vicinity of $\tau_0$ when a signal is received (e.g., from a client), the gain of the compensated path $b^* c^*(t) d_2^{AP}$ has approximately unit magnitude and phase $\theta_0$. Again, in the time vicinity of a subsequent update at time $\tau_n$, the phase of this compensated path remains approximately $\theta_0$.

One way of taking advantage of the receive compensation, as is detailed below in Section 5 dealing with reciprocity based channel estimation, is after a transmission from a client that is received both at the master access point and at the slave access point, the master access point immediately sends a transmission (e.g., an acknowledgement directed at the client but overheard by the slave access point) that is received by the slave access point. The slave access point effectively applies the phase correction $\angle(b^* c^*(t)) = -(\psi_n - \psi_0) - (t-\tau_n)\Delta\omega_n$ to the transmission from the client essentially retroactively.

Note the phase correction presented above addresses the differences between the master's oscillator and the slave's oscillator, and therefore the slave access point effectively receives the transmission as if its oscillator were synchronized with the master. However, the transmitting client also has a oscillator offset from the master access point, and therefore, the transmissions that are received at the master access point and the slave access point will, in general, exhibit a phase offset and phase rotation during the transmission due to the lack of synchronization of the client and master oscillators. To the extent that both the master and the slave access points have no (or the same) detection delay, this phase offset and phase rotation is the same at both the master and the slave access points. Even when the detection delay is not the same, the approach yields the same result thereby being insensitive to the differences in detection delay.

2.4 Access Point to Client Channels

The effective baseband signal path from the master access point (j=1) to client i is $g_{i1} = d_i(t) r_i a_{i1} t_1^{AP}$. If the client uses known values in the transmission to compensate for its oscillator phase and frequency offsets, then the effective channel is $\tilde{g}_{i1} = r_i a_{i1} t_1^{AP}$ Assuming that the slave access points compensate for their rotating transmit phase relative to the master as described above, and the correction terms remain accurate, the effective phase-corrected baseband signal path from the slave access point j to client i (i.e., taking into account the compensation of the input in the b and c(t) blocks) is $g_{ij} = d_i(t) r_i a_{ij} t_j^{AP} d^{*AP}_j(\tau_0)$, where $d^{*AP}_j(\tau_0) = \exp(-j\theta_0)$ is the effect of the initial phase measured at that slave access point and recorded at slave access point j. Again, if the client uses known symbols in the transmission to compensate for its oscillator phase and frequency offsets, then the effective channel is $\tilde{g}_{ij} = r_i a_{ij} t_j^{AP} d^{*AP}_j(\tau_0)$.

It is important to note that the channel estimates $h_{ij}$, which form the elements of the matrix H, are only required to be known to within a (complex) proportionality $\alpha_i$, which depends on the destination client i. In the discussion below this proportionality constant defined such that $h_{ij} = \alpha_i g_{ij}$.

3 Coherent Transmission from Slave Access Points

Steps that lead up to concurrent transmission from the multiple access points consistent with the principles described above is therefore as follows. Note that there is an underlying assumption in these examples that the access points are linked by high-capacity backend channel (e.g., gigabit wired Ethernet). Frames intended for clients are distributed to all the access points through the shared backend channels, and the desired precoding of the frames (e.g., $H^{-1}$) is coordinated via the backend channel as well.

In this example, it is assumed that one access point has already been identified as the master access point, for example, because it was the first to power up or because it is particularly configured to act as the master. In this example, we assume that there are N−1 slave access points (numbered 2, . . . , N with the master being numbered 1), each with one antenna, which will participate in the simultaneous transmissions.

Initialization:

1) For each slave access point n=2, . . . , N, at a time $\tau_0^{(n)}$ the master sends an initial transmission to that slave, based on which the slave determines an initial phase offset $\psi_0^{(n)}$ for each frequency component (i.e., $\psi_0^{(n)}$ can be represented as a vector for all the frequency components) which it records. Note that these initializations are not in general concurrent for all the slave access points.

Concurrent transmission from access points:

2) At a time $\tau_1$, the master transmits a synchronization frame directed to each of the slaves. We assume that via backend channel and/or via identifying information in the synchronization frame the slaves determine the desired frames $S_n$ to transmit from each of the access points.

3) At each of the slave access points n=2, . . . , N:
   a) the transmission from the master is detected (recognizing that each slave may detect that transmission at a slightly different delay)
   b) the slave access point determines a new phase offset $\psi_1^{(n)}$ and frequency offset $\Delta\omega_1^{(n)}$ (i.e., estimates for each frequency component, although the estimates of $\Delta\omega_1^{(n)}$ may make use of information from a range of frequency component) based on which it configures it correction elements b and c(t).
   c) a fixed delay after detection of the transmission from the master, the slave transmits the frame $S_n$ via its configured correction elements b and c(t)

As introduced above, the result of this correction is that each access point effectively maintains a fixed phase (provided to the transmit components $t_j^{AP}$) relative to the master.

Steps 2 and 3 are repeated in subsequent transmissions.

Note that step 2 is described above as a transmission of an entire frame to the slave. It should be understood that a preamble of a frame (e.g., a 802.11n legacy preamble) can be sufficient for the slave to synchronize and then join in with the transmission from the master, such that the preamble is transmitted from the master and the body of the frame is transmitted from the master and the slave. Such an approach can be compatible with wireless Ethernet standards, for example, in that automatic gain control and channel estimation is not performed until after the legacy preamble.

3.1 Multiple Antenna Access Points

Note that although the discussion addresses single-antenna access points, multiple antenna access points are addressed by making use of the observation that such multiple antennas make use of a common oscillator. Therefore, the procedures described above for one antenna can be extended to multiple antennas by making use of one antenna for receiving the synchronizing transmission from the master, or equivalently, a fixed combination (weighting) of multiple antennas, for example, providing a desirable receive sensitivity in the direction of the master access point. Each transmit stream is then compensated independently using the same estimated compensation terms (b and c(t)).

4 Client Feedback Based Channel Estimation

As discussed above, the master and slave access points can form coherent transmissions by the master access point first sending a synchronizing transmission and then at a fixed delay both master and slave sending transmissions to one or more clients.

Generally one approach to channel estimation involves a client receiving the concurrent transmissions and being able to identify components of the transmission from each of the access points that include known symbols, thereby allowing it to estimate the channels from each of the access points, and report those channels to the access points, which in turn compose the overall channel matrix H, which is then inverted and used to determine the values $s_i$ in subsequent transmissions.

One approach to permitting the client to identify the components from each of the access points is to interleave transmissions in time from each of the access points in a pattern known to the client. Because the transmission includes only one access point transmitting at a time, the client can determine each channel separately.

Another approach is for each of the access points to send a different set of linearly independent known values. For example, in the case of two simultaneous transmissions, if the master sends ($s_{11}=z$, $s_{12}=z$) and the slave sends ($s_{21}=z$, $s_{22}=-z$), the client effectively receives ($s_{11}\tilde{g}_{i1}+s_{21}\tilde{g}_{i2}$, $s_{12}\tilde{g}_{i1}+s_{22}\tilde{g}_{i2}$) from which it can solve for $\tilde{g}_{i1}$ and $\tilde{g}_{i2}$ to report back to the access points. More generally, $N_c$ linearly independent sequence of at least $N_c$ values are sent from multiple access points, and a client determines the relative channels (i.e., the channels to within an unknown complex scale factor) from each of the access points.

Note that channels to multiple clients may be determined in this manner, with the transmissions to different clients being made at different times, or optionally, the same transmissions from the access points being used by more than one client to estimate the channels. Furthermore, the sequence of transmissions with different subsets of antennas may be interleaved for different clients.

4.1 Compatibility with 802.11n

A feature that is specified in the 802.11n standard is referred to as Channel State Information (CSI) feedback. Although originally intended to provide feedback to a single N antenna access point, as described below, the feature can be exploited in the distributed approach, and can also be extended to situations in which the number of access points exceeds the maximum number of access point antenna contemplated in the standard.

In the description below the feedback features of 802.11n are outlined. Details may be found in IEEE Standard 802.11n-2009—*Amendment 5: Enhancements for Higher Throughput.* 29 Oct. 2009, for example, in Sections 7.3.1.28 "Noncompressed Beamforming Report field" and 20.3.12.2 "Explicit feedback beamforming". We assume that the feedback by a client is limited to $N_c$ independent streams, and in a number of examples we specifically assume that $N_c=4$.

In a first example, there is a master access point and exactly three slave access points, each with one antenna. In this example, the N=4 separate access points transmit the independent streams, synchronized by a transmission from the master access point to the slave access points, providing a signal that the client perceives to have come from a four-antenna access point. The client provides the downlink channel feedback to the access points in the same manner as contemplated by the standard, thereby providing the needed four downlink channels directly.

In a second example, we assume that the maximum number of independent streams that can be processed by the client is $N_c=2$, and that the master access point has two antennas, and one slave access point has one antenna. In a first phase, at a time $\tau_1$, the master access point sends two independent streams to the client from its two antennas, and the client replies with two channel estimates, one from each of the two master antenna to that client's antenna, which we denote $h_{1,1a}$ and $h_{1,1b}$. In a second phase, at time $\tau_2$, the master (from the "a" antenna) and slave access point each send one independent stream to the client. The client reports two channel estimates $\tilde{h}_{1,1a}$ and $\tilde{h}_{1,2}$. Note however, that due to a number of factors, in general $h_{1,1a} \neq \tilde{h}_{1,1a}$. For example, these factors include a relatively phase change between the master oscillator and the client oscillator (or difference in detection delay from the transmission at time $\tau_1$ to that a time $\tau_2$) such that the desired channels are proportional to the reported channels to within a unit magnitude complex scale factor (i.e., a phase rotation). This change can be addressed by setting $$h_{1,2} = \tilde{h}_{1,2} \exp j(\angle h_{1,1a} - \angle \tilde{h}_{1,1a}) = \tilde{h}_{1,2} \exp j(\angle (h_{1,1a}/\tilde{h}_{1,1a}))$$

More generally, for a large number (N) of access points, different groups of $N_c<N$ streams can be sent to a client at different times (not necessarily including any from the master access point, but nevertheless triggered by a synchronizing signal from the access point). An estimate of the channels can then be maintained under the assumption that there is an unknown unit magnitude scale factor for the channels. In situations in which the client can be assumed to be relatively stationary during the succession of transmission times, the estimate can be based on the channels being unknown constants. An example of such a scheme could involve a rapid succession $[(N-1)/(N_c-1)]$ transmission to determine all N channels. More generally, if the succession of transmission times spans a longer interval, the estimate of a current channel may be based on a model of change of the channels, for example, to rely on more recent channel reports to a greater extent than older channel reports from the clients.

Note that in the CSI based approaches described above, even in the case when $N_c=N$, the channel estimates to different clients are generally made at different times. Therefore, there is a relative phase difference due to the difference between the master oscillator and the client oscillator at those different times. Therefore, as compared to determining the channel estimates at the same time, the estimates made at a second time are known only to within a constant phases rotation, so the each row of H is essentially only known within a unit magnitude complex scale factor. However, such a scale factor is manifested in the combined phase of the signal received at the client being rotated, but does not affect the relative phase of the transmissions from the access points. Therefore, the approach can ignore this phenomenon when setting the overall channel estimates to all the clients.

Note that the approach described above can be applied in the case in which greater than $N_c$ antennas are at a single access point, potentially synchronized with the same oscillator. Nevertheless, subsets of $N_c$ antennas can be used at a time in successive transmissions to gain a complete channel matrix suitable for subsequent transmission through all N antennas.

5 Reciprocity Based Channel Estimation

Generally, in reciprocity-based approaches described below, a transmission from a client that is received by both the master access point and the slave access point is used to estimate the channels from the access points to the client. Essentially, known symbols in the transmission from the client are used to estimate the uplink channels, from which the downlink channels are estimated. This approach does not require any feedback from the clients, for example, not requiring the CSI feedback described above.

Before describing the operation of the channel estimation approach, we first describe some further principles of operation, consistent with FIG. 2 and the description in Section 2 above.

5.1 Reciprocity Coefficient

Before describing the principle by which uplink transmissions are used to estimate the downlink channels, an approach to computing and updating a coefficient is described. It is shown below how this coefficient is used for channel estimation.

An approach to establishing the initial phase offset $\psi_0$ at time $\tau_0$ at a slave access point is described above. This initialization is extended to involve both a transmission from the master to the slave, and immediately thereafter a transmission from the slave to the master. Suppose that at time $\tau_0$ the master sends a known value $x_1$ to the slave, which the slave receives it as $y_1$. As discussed above, $y_1 = d_2^{AP}(\tau_0) r_2^{AP} a_{12}^{AP} t_1^{AP} x_1$, and the initial phase is set by the slave to $\psi_0 = \angle (d_2^{AP})(\tau_0) r_2^{AP} a_{12}^{AP} t_1^{AP}) = \theta_0 + \angle (r_2^{AP} a_{12}^{AP} t_1^{AP})$.

Suppose immediately thereafter (i.e., after a fixed delay known to the master) the slave sends a known value $x_2$ to the master, compensated for the phase rotation according to the element $c(t)$ initialized as discussed above (recall that initially b=1, which the master receives as $y_2$. Based on the discussion above, this value is therefore $y_2 = r_1^{AP} a_{12}^{AP} t_2^{AP} d^*_2^{AP}(\tau_0) x_2$. Based on these two transmissions (and suitable exchange of the channel information between the master and the slave), a slave-specific coefficient $$K = \frac{(y_2/x_2)}{(y_1/x_1)} = \frac{r_1^{AP} a_{12}^{AP} t_2^{AP} d_2^{*AP}(\tau_0)}{d_2^{AP}(\tau_0) r_2^{AP} a_{12}^{AP} t_1^{AP}} = \frac{r_1^{AP} t_2^{AP}}{r_2^{AP} t_1^{AP}} e^{-j2\theta_0}$$

is computed for that slave. Note that in some examples, the coefficient K is assumed to be the same for all frequency components k, but alternatively, separate frequency dependent estimates may be used.

Note that this coefficient is expected to be relatively stable because the receive and transmit paths (e.g., the electronic components) in the access points are not expected to change quickly. Nevertheless, this coefficient can be updated using a subsequent pair of transmissions at a later time $\tau_n$. If $y_1$ is received at the output of the $d_2^{AP}$ block, and then compensated as described above as $\tilde{y}_1 = b^* c^*(t) y_1$ to account for the newly estimated offset between the master and the slave, the channel experienced from $x_1$ to $\tilde{y}_1$ is $$\tilde{y}_1 = b^* c(t) d_2^{AP}(\tau_n) r_2^{AP} a_{12}^{AP} t_1^{AP} x_1 \approx d_2^{AP}(\tau_0) r_2^{AP} a_{12}^{AP} t_1^{AP} x_1$$

because as discussed above $b^* c^*(t) d_2^{AP}(\tau_n) \approx d_2^{AP}(\tau_0)$ has unit magnitude and phase $\theta_0$.

For the return path, the known value $x_2$ is first passed through the b and c(t) blocks (updated according to the transmission from the master to the slave) to yield $\tilde{x}_2$, which is passed through the $d^*_2{}^{AP}(t)$ block back to the master. The channel from $x_2$ to $y_2$ is therefore $y_2 \approx r_2^{AP} a_{12}^{AP} t_2^{AP} d^*_2{}^{AP}(\tau_0) x_2$. The updated coefficient then is updated as $$K = \frac{(y_2/x_2)}{(\tilde{y}_1/x_1)} = \frac{r_1^{AP} a_{12}^{AP} t_2^{AP} d_2^{*AP}(\tau_0)}{d_2^{AP}(\tau_0) r_2^{AP} a_{12}^{AP} t_1^{AP}} = \frac{r_1^{AP} t_2^{AP}}{r_2^{AP} t_1^{AP}} e^{-j2\theta_0}$$

which can also be expressed or computed as $$K = \frac{(y_2/x_2)}{(y_1/x_1)} e^{j(\psi_n - \psi_0)}.$$

Note that the coefficient K is computed for each slave separately, and that the base time $\tau_0$ is in general different for each slave. For example, as each slave access point is powered up, the master sends a transmission to that slave establishing the initial phase $\psi_0$ for that slave. At that time, or at a subsequent time, the master and slave perform the exchanges $x_1 \to y_1 \to \tilde{y}_1$ and $x_2 \to y_2$, to set or update that slave's coefficient K.

5.2 Channel Estimate

Channel estimates from the master and slave to a client are then based on both the observed uplink channels from the client to each of the access points and the current estimate of the coefficient K described above.

Before describing the approach in detail, note that although the air channel $a_{ij}$ between an access point j and a client i is reciprocal, and therefore introduces the same complex gain on uplink and downlink paths, on an uplink transmission, at access point j, the signal passes through a receiver channel $r_j^{AP}$ while on the downlink transmission, the signal passes through a transmit channel $t_j^{AP}$. Therefore one aspect of reciprocity-based channel estimation addresses this difference.

Consider a situation in which a client i sends a transmission of a known value x at time $\tau_n$, which is received at the master access point as $y_1$ as well as at the slave access point as $y_2$. In this first analysis, we assume that neither the master nor the slave access points introduce any detection delay in their receiving of the client's transmission. The master therefore receives the transmission over the channel $y_1 = u_{i1} x$ where $u_{i1} = r_1^{AP} a_{i1} t_i d_i(\tau_n)$. The slave similarly receives $y_2 = u_{i2} x$ where $u_{i2} = d_2^{AP}(\tau_n) r_2^{AP} a_{i2} t_i d_i(\tau_n)$. As discussed above, the slave can compensate for the oscillator offset and rotation from the master, for example, by computing $\tilde{y}_2 = b^* c^*(t) y_2$ so that $\tilde{y}_2 = \tilde{u}_{i2} x$ where $\tilde{u}_{i2} \approx d_2^{AP}(\tau_0) r_2^{AP} a_{i2} t_i d_i(\tau_n)$.

In one approach, the master takes this to be the channel estimate $h_{i1} = u_{i1} = (y_1/x)$. For reference, note that this choice of $h_{i1}$ effectively sets the proportionality constant $\alpha_i$ used for all $h_{ij} = \alpha_i g_{ij}$.

For this choice of the proportionality constant, a suitable choice of channel from the slave access point is $$h_{i2} = K \tilde{u}_{i2} = K(\tilde{y}_2/x) = K(y_2/x) e^{-j(\psi_n - \psi_0)}.$$

The suitability of this choice for the channel can be verified by showing that $h_{i2}/h_{i1} = g_{i2}/g_{i1}$ as follows:

$$\begin{aligned} h_{i2}/h_{i1} &= K \tilde{u}_{i2}/u_{i1} \\ &= \left(\frac{r_1^{AP} a_{12}^{AP} t_2^{AP} d_2^{*AP}(\tau_0)}{d_2^{AP}(\tau_0) r_2^{AP} a_{12}^{AP} t_1^{AP}}\right)(d_2^{AP}(\tau_0) r_2^{AP} a_{i2} t_i d_i(\tau_n))/(r_1^{AP} a_{i1} t_i d_i(\tau_n)) \\ &= (a_{i2} t_2^{AP} d_2^{*AP}(\tau_0))/(a_{i1} t_1^{AP}) = \tilde{g}_{i2}/\tilde{g}_{i1} \end{aligned}$$

Note that the discussion above is somewhat simplified treating the value x as being transmitted by the client at exactly time $\tau_n$. More generally, there is a sequence of known values that are transmitted over short time interval after $\tau_n$. Even compensating for the master-to-slave offset, the received values will exhibit the same phase rotation during the transmission. To the extent that the master and the slave compensate for this rotation in the same way in determining $u_{i1}$ and $\tilde{u}_{i2}$. Then the analysis above remains valid.

Furthermore, the discussion above does not address the detection delay, which may be different at the master and the slave for the transmission from the client. One way to address this potential difference in detection delay is for the master to send the acknowledgment, which is overhead by the slave, at a fixed known delay after it has detected the transmission from the client. The slave then detects the acknowledgement from the master at that same fixed delay after it detected the transmission from the client. It can be shown that the cumulative effects of these delays is that the channel estimates $h_{ij}$ are all multiplied by the same phase term, and therefore this multiple can be ignored.

5.3 Reciprocity Based Channel Estimation Procedure

Steps that lead up to determination of channel estimates from multiple access points to a particular consistent with the principles described above is therefore as follows.

In this example, it is again assumed that one access point has already been identified as the master access point, for example, because it was the first to power up or because it is particularly configured to act as the master. In this example, we assume that there are N−1 slave access points (numbered 2, ..., N with the master being numbered 1), each with one antenna, which will participate in the simultaneous transmissions.

Initialization:

1) For each slave access point n=2, ..., N, at a time $\tau_0^{(n)}$ the master sends an initial transmission to that slave, based on which the slave determines an initial phase offset $\psi_0^{(n)}$ for each frequency component (i.e., $\psi_0^{(n)}$ can be represented as a vector) which it records. Note that these initializations are not in general concurrent.

Reciprocity Coefficient Setting:

2) For each slave access point n=2, ..., N, at a time $\tau_1^{(n)}$ the master sends a known transmission $x_1$ to that slave, which is received as $y_1$, based on which the slave determines a phase offset $\psi_1^{(n)}$ for each frequency component (and frequency offset $\Delta\omega_1^{(n)}$) and sets its compensation terms b and c(t) as described above.

3) A fixed delay after receiving $y_1$ (i.e., a fixed time after detecting the arrival of $y_1$), the slave transmits a known transmission $x_2$, compensated according to b and c(t) to the master, which it receives at that fixed delay after transmitting $x_1$ as $y_2$.

4) The master access point reports the received $y_2$ to the slave access points, which then updates its coefficient as $$K = \frac{(y_2/x_2)}{(y_1/x_1)} e^{j(\psi_n - \psi_0)}$$

Note that above, steps 1 and 2-4 can be performed at one time, and steps 2-4 can be repeated, for example, to account for change in the channel characteristics between the master and slave access points.

Processing Client Uplink Transmission:

5) At a time $\tau_2$, client i transmits a known signal x which is received at each access point j as $y_j$.

6) After a fixed delay from receipt of $y_1$ at the master access point, the master access point sends a signal that is received at each of slave access points, for example, an acknowledgement that is directed to the client i and overheard by the slave access points.

7) For each slave access point j=2, ..., N, the slave access point j receives the master's transmission as $z_j$ at that same fixed delay from its receipt of $y_j$. The slave uses $z_j$ to determine $\psi_2$ and set b and c(t) at that access point (in the manner described above), and determine $\tilde{y}_j = b^* c(t) y_j$ to compensate for the now known phase offset and oscillator frequency difference between the master and that slave. The slave then computes and exchanges the downlink channel as follows:

$$h_{ij} = K(\tilde{y}_2/x) = K(y_j x) e^{-(\psi_2 - \psi_0)}$$

Note that steps 5-8 do not have to be performed on every uplink transmission from a particular client i, for example, performing sufficient channel updates to track channel changes due to movement of clients in an environment. Also, note that in alternative approaches, step 6 can precede step 5, for example, with the master transmitting a signal that is received by the client and overheard by the slave access point, with the client sending the signal x shortly after receipt of the signal from the master access point. Furthermore, it should be recognized that the channel estimates for different clients made at different times nevertheless are compatible for forming the channel matrix suitable for the MIMO coding for concurrent transmission to the different clients.

5.4 Synchronized Receiving at Access Points

Note that the approach described above effectively makes use of correction of the phase and frequency at receivers of multiple access points in order to maintain a fixed relative phase of the receive paths at different receive times. For example, when a client transmits x, the compensated received signals $\tilde{y}_j = b^* c(t) y_j$ at the access points j is related to the transmission x through the relatively fixed uplink channel $\tilde{u}_{ij}$, as described above. In some implementations, compensated received signals $\tilde{y}_j$ are combined from multiple access points (e.g., by communicating them over the high-speed backbone) in order to improve the upstream data throughput (or lower error rate) using a joint decoding approach.

More specifically, in an example, this synchronized uplink processing involves the following 1) Client i makes a transmission x 2) The transmission is received at multiple access points j, for example all access points j=1, 2, ... N as $y_j$.

3) The master access point emits a transmission (e.g., an acknowledgment to client i, or a special-purpose synchronizing transmission) that is received at the other (slave) access points j=2, ..., N.

4) Each slave computes the computation terms b and c(t) reflecting the phase and frequency correction between oscillators, and computes the corrected received signal $\tilde{y}_j = b^* c(t) y_j$ 5) The slaves all send the their corrected signals to the master, which applied processes the signals as if they had been received at the antennas of the slaves using common oscillator.

This approach provides a way to improve uplink performance, for example, by steering the receiver pattern to the location of the client.

6 Alternatives

It should be reiterated that in the description above, and in the claims, the term "access point" is used broadly to include not only fixed wireless stations that provide an interface between a wired network and wireless devices, but more boardly to include any class of wireless stations, whether fixed or not, and not necessarily coupled to a wired network, that function as source stations that pass data to wireless client. Similarly the term "client" or "wireless client" should be understood to include not only stations that are linked via a wireless network via access points to a wired network, but more broadly to include any class of wireless stations that function as destination stations that receive data from access points as defined above. Furthermore, in some systems, the same station may serve the role of an access point for some communication and as a client for other communication. Furthermore, two "access points" do not necessarily have to be physically distributed, yet may still have unsynchronized oscillators, for example, with each access point being a largely independent module within a larger system at one location.

It should be understood that although the examples described above include only a single antenna per oscillator, access points more generally include multiple antennas that may share a common oscillator, and therefore separate frequency and phase offset estimates are not needed for each antenna signal.

In some embodiments, rather than estimating $\psi_0$ at some initial time for each slave access point, these quantities can be set to $\psi_0=0$, or initialized in some other way, while maintaining the same coherent operation of the system.

Also, it should be understood that although described in the context of wireless Ethernet, and more particularly in the context of IEEE Standard 802.11n, the approach is not limited to these standards. For example, other forms of client feedback and other implementations of that make use of the reciprocity techniques described above can be used in other wireless standards.

Implementations of the approaches may be in software, for example, stored on tangible machine readable media, for controlling processors in the access points and/or clients. Some implementations may use special-purpose hardware (e.g., application specific integrated circuits) in addition or instead of software.

Other features and advantages of the invention are apparent from the following description, and from the claims.

What is claimed is:

1. A method for determining channel characteristics between a plurality of wireless access points, the wireless access points together having a plurality of antennas, and each of one or more wireless clients, each client having one or more antennas, the method comprising:
   in each stage of multiple stages,
      transmitting known independent signal streams from a subset of antennas of the plurality of antennas, a different subset of antennas being used in each stage with each subset sharing at least one antenna with at least one other subset,
      receiving the streams at a first client of the wireless clients,
      determining data characterizing transmission channels from the subset of antennas to the first client,
      communicating the data to one or more of the access points; and
   combining the data for the different subsets of antennas to form consistent channel estimates via each of the antennas to the first client.

2. The method of claim 1 wherein the plurality of access points include at least a first access point and a second access point having radio frequency oscillators used for transmitting and receiving that are unsynchronized to one another in at least one of frequency and phase.

3. The method of claim 1 wherein combining the data includes compensating for a phase factor for each stage of at least some of the multiple stages.

4. The method of claim 1 wherein transmitting known independent signal streams from a subset of antennas includes transmitting said signals via antennas of multiple access points of the plurality of access points, the multiple access points having radio frequency oscillators used for transmitting and receiving that are unsynchronized to one another in at least one of frequency and phase.

5. The method of claim 4 wherein transmitting the signals via antennas of the multiple access points comprises:
   transmitting a first signal from a first access point of the multiple access points and receiving the first signal at each other access point of the multiple access points,
   determining a phase characteristic of the received first signal at each of the other access points, and
   modifying the known independent signal streams prior to transmission via the antennas of the other access points according to the determined phase characteristics.

6. The method of claim 5 wherein the determined phase characteristic comprises a time-varying phase characteristic.

7. The method of claim 5 wherein modifying the known independent signal streams prior to transmission at each of the other access points in each of the multiple stages comprises compensating lack of synchronization in at least one of frequency and phase of the radio frequency oscillators among the access points of the plurality of access points.

8. The method of claim 5 wherein transmitting the signals via antennas of the multiple access points further comprises transmitting the modified signal streams at a predetermined delay after receiving the first signal.

9. The method of claim 1 wherein combining the data for the different subsets of antennas to form consistent channel estimates via each of the antennas to the first client includes matching the data characterizing the transmission channels of the shared antennas between different of the stages.

10. A method for determining channel characteristics between a plurality of wireless access points, the wireless access points together having a plurality of antennas, and each of one or more wireless clients, each client having one or more antennas, the method comprising:
   in each of multiple stages,
      transmitting known independent signal streams from a subset of antennas of the plurality of antennas, a different subset of antennas being used in each of the multiple stages with each subset of antennas sharing at least one antenna with at least one other subset,
      receiving data characterizing transmission channels from the subset of antennas to a first client determined at the first client; and
   combining the data for the different subsets of antennas to form consistent channel estimates via each of the antennas to the first client.

11. A method for operating a plurality of wireless access points, the wireless access points together having a plurality of antennas, to provide coordinated reception of a transmission from a wireless client, the method comprising:
   receiving a first transmission from the wireless client at each of the plurality of access points, and demodulating the received transmission at each access point, at least some of the access points having oscillators not synchronized in at least one of frequency and phase with other of the access points;
   receiving a signal from a first access point at each of the plurality of access points, and demodulating the received signal from the first access point at each access point;
   modifying, for each access point, the demodulated received transmission from the wireless client received at said access point according to the demodulated signal from the first access point received at said access point; and
   combining the modified received transmissions to process the transmission from the wireless client.

12. Software embodied on a non-transitory computer-readable medium comprising instructions for causing one or more processors associated with a plurality of wireless access points, which together have a plurality of antennas, to:
   cause the access points, in each of multiple stages,
      transmit known independent signal streams from a subset of antennas of the plurality of antennas, a different subset of antennas being used in each of the multiple stages with each subset of antennas sharing at least some antenna with at least one other subset, and
      receive data characterizing transmission channels from the subset of antennas to a first client determined at the first client; and
   combining the data for the different subsets of antennas to form consistent channel estimates via each of the antennas to the first client.

13. A wireless communication system comprising a plurality of wireless access points, the wireless access points together having a plurality of antennas, and each of one or more wireless clients, each client having one or more antennas, configured to communicate with each of one or more wireless clients, each client having one or more antennas, wherein the access points are configured to:
   in each of multiple stages,
      transmit known independent signal streams from a subset of antennas of the plurality of antennas, a different subset of antennas being used in each of the multiple stages with each subset of antennas sharing at least one antenna with at least one other subset, and
      receive data characterizing transmission channels from the subset of antennas to a first client determined at the first client; and combining the data for the different subsets of antennas to form consistent channel estimates via each of the antennas to the first client.

14. A method for determining channel characteristics from a plurality of wireless access points, including at least a first access point and a second access point having radio frequency oscillators used for transmitting and receiving that are unsynchronized to one another in at least one of frequency and phase, to each of one or more wireless clients, the method comprising:
   exchanging a first set of transmissions including known symbols between the first access point and the second access point;
   using the first set of transmissions to determine first data characterizing a relationship of transmit and receive path characteristics between the first and the second access points;
   receiving a transmission including known symbols from a first client at each of the first access point and the second access point; and
   combining the first data and the transmission received at the first and the second access points to determine channel characteristics for transmissions from the first and the second access points to the first client.

15. The method of claim 14 wherein:
   receiving the transmission at each of the first access point and the second access point includes demodulating the transmission at the first access point to form a first demodulated signal and at the second access point to form a second demodulated signal; and
   the method further comprises:
   receiving a synchronizing transmission from the first access point at the second access point; and
   determining synchronizing data characterizing at least one of a difference in demodulation frequency and demodulation phase between the first access point and the second access point;
   wherein combining the first data and the demodulated signals includes using the synchronization data to determine the channel characteristics.

16. The method of claim 14 further comprising:
   repeatedly updating the first data by repeating the steps of exchanging transmissions and using the transmissions to determine the first data.

17. Software embodied on a non-transitory computer-readable medium comprising instructions for causing one or more processors associated with a plurality of wireless access points to:
   exchange a first set of transmissions including known symbols between a first access point and a second access point;
   use the first set of transmissions to determine first data characterizing a relationship of transmit and receive path characteristics between the first and the second access points;
   receive a transmission including known symbols from a first client at each of the first access point and the second access point; and
   combine the first data and the transmission received at the first and the second access points to determine channel characteristics for transmissions from the first and the second access points to the first client.

18. A wireless communication system comprising a plurality of wireless access points configured to:
   exchange a first set of transmissions including known symbols between a first access point and a second access point;
   use the first set of transmissions to determine first data characterizing a relationship of transmit and receive path characteristics between the first and the second access points;
   receive a transmission including known symbols from a first client at each of the first access point and the second access point; and
   combine the first data and the transmission received at the first and the second access points to determine channel characteristics for transmissions from the first and the second access points to the first client.

* * * * *